(12) United States Patent
Leroux et al.

(10) Patent No.: US 10,757,630 B2
(45) Date of Patent: Aug. 25, 2020

(54) NETWORK ABSTRACTOR FOR ADVANCED INTERACTIVE SDN OPTIMIZATION

(71) Applicant: Huawei Technologies Co., Ltd., Shenzhen (CN)

(72) Inventors: Philippe Leroux, Ottawa (CA); Aaron James Callard, Ottawa (CA); Alex Stephenne, Stittsville (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 201 days.

(21) Appl. No.: 14/555,018

(22) Filed: Nov. 26, 2014

(65) Prior Publication Data
US 2016/0150460 A1    May 26, 2016

(51) Int. Cl.
| | |
|---|---|
| *H04W 40/18* | (2009.01) |
| *H04W 24/08* | (2009.01) |
| *H04W 24/02* | (2009.01) |
| *H04L 12/24* | (2006.01) |

(52) U.S. Cl.
CPC ......... *H04W 40/18* (2013.01); *H04L 41/0816* (2013.01); *H04L 41/0886* (2013.01); *H04L 41/147* (2013.01); *H04W 24/02* (2013.01); *H04W 24/08* (2013.01)

(58) Field of Classification Search
CPC .. G06F 8/35; G06F 8/41; G01R 31/08; G05B 2219/31094; G05B 2219/35582; G05B 17/02; G05B 11/32; H04J 1/16; H04L 12/801; H04L 41/145; H04L 41/0803; H04L 41/0813; H04L 41/0843; H04L 41/0866; H04L 41/0876; H04L 41/0883; H04L 41/5019; H04L 43/08; H04L 43/50; H04L 43/0876; H04L 43/0882; H04L 45/56; H04L 45/64; H04L 45/70; H04L 45/123; H04W 40/18
See application file for complete search history.

(56) References Cited

U.S. PATENT DOCUMENTS

| | | | |
|---|---|---|---|
| 2009/0059793 A1* | 3/2009 | Greenberg | |
| 2013/0250770 A1* | 9/2013 | Zou | ........................ H04L 47/19 370/238 |
| 2014/0098687 A1 | 4/2014 | Anthony, Jr. et al. | |
| 2014/0207923 A1 | 7/2014 | Jokinen et al. | |
| 2014/0310388 A1* | 10/2014 | Djukic | ................ H04L 41/0816 709/221 |

(Continued)

FOREIGN PATENT DOCUMENTS

| | | |
|---|---|---|
| CN | 103095565 A | 5/2013 |
| CN | 103944871 A | 7/2014 |

(Continued)

*Primary Examiner* — Marsha D Banks Harold
*Assistant Examiner* — Dharmesh J Patel
(74) *Attorney, Agent, or Firm* — Slater Matsil, LLP

(57) ABSTRACT

Methods and apparatus optimize settings of a wireless communication network via an abstractor. The abstractor receives an event sent by the wireless communication network. The abstractor receives one or more proposed settings from one or more optimizers of the wireless communication network. The abstractor transmits one or more predicted values to the one or more optimizers. The predicted values predict the effect that the one or more proposed settings will have on the wireless communication network.

27 Claims, 5 Drawing Sheets

(56) References Cited

U.S. PATENT DOCUMENTS

2014/0355441 A1* 12/2014 Jain
2014/0362686 A1* 12/2014 Jogalekar ................ H04L 47/12
                                                          370/229
2014/0362688 A1* 12/2014 Zhang ............... H04W 28/0289
                                                          370/230
2015/0195745 A1*  7/2015 Farmanbar ............ H04W 28/12
                                                          370/236

FOREIGN PATENT DOCUMENTS

EP          2787698 A2    10/2014
WO    WO-2015112159 A1 *  7/2015   ........... H04L 41/042

* cited by examiner

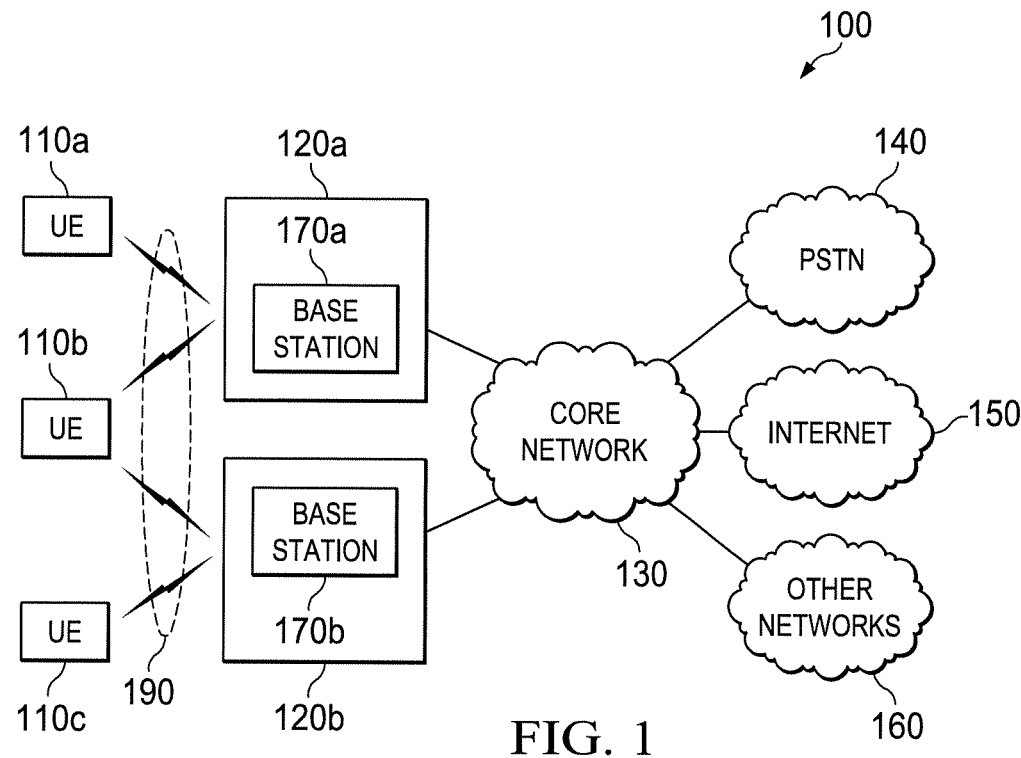
FIG. 1
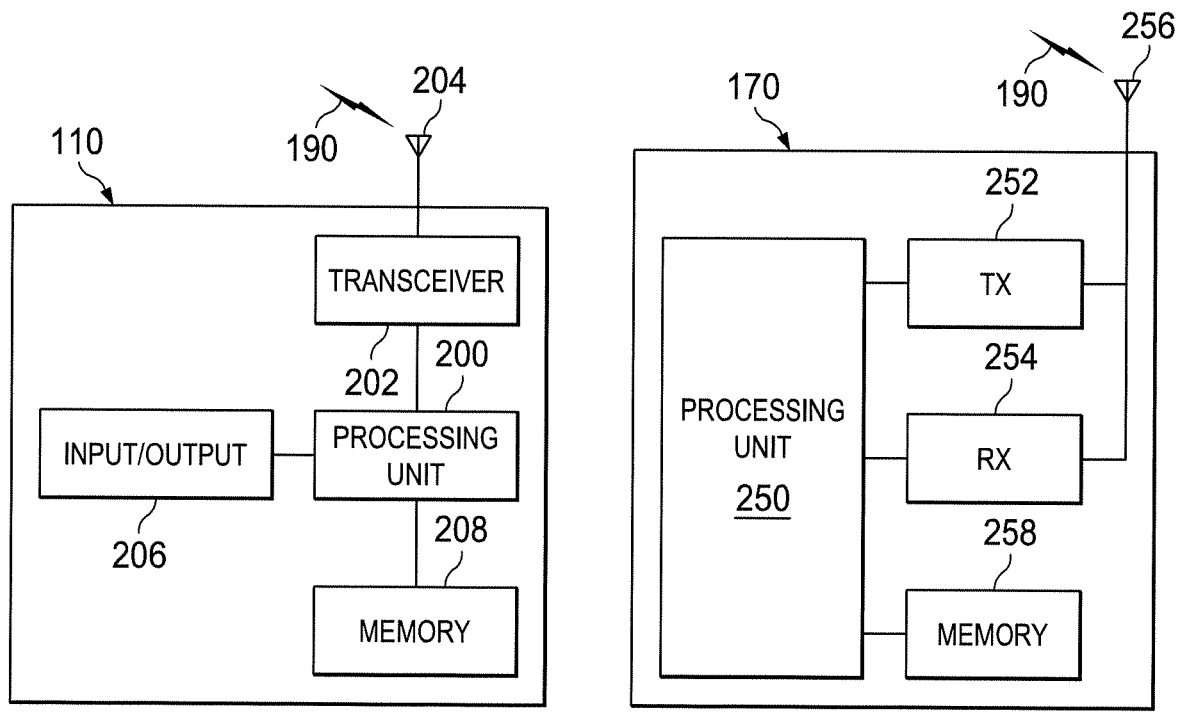
FIG. 2A
FIG. 2B

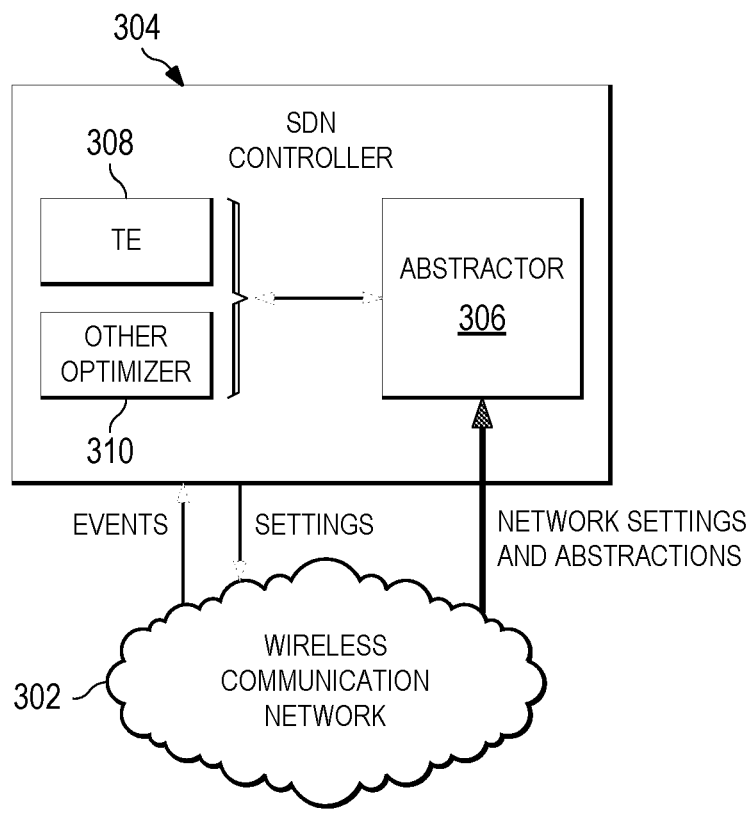
FIG. 3
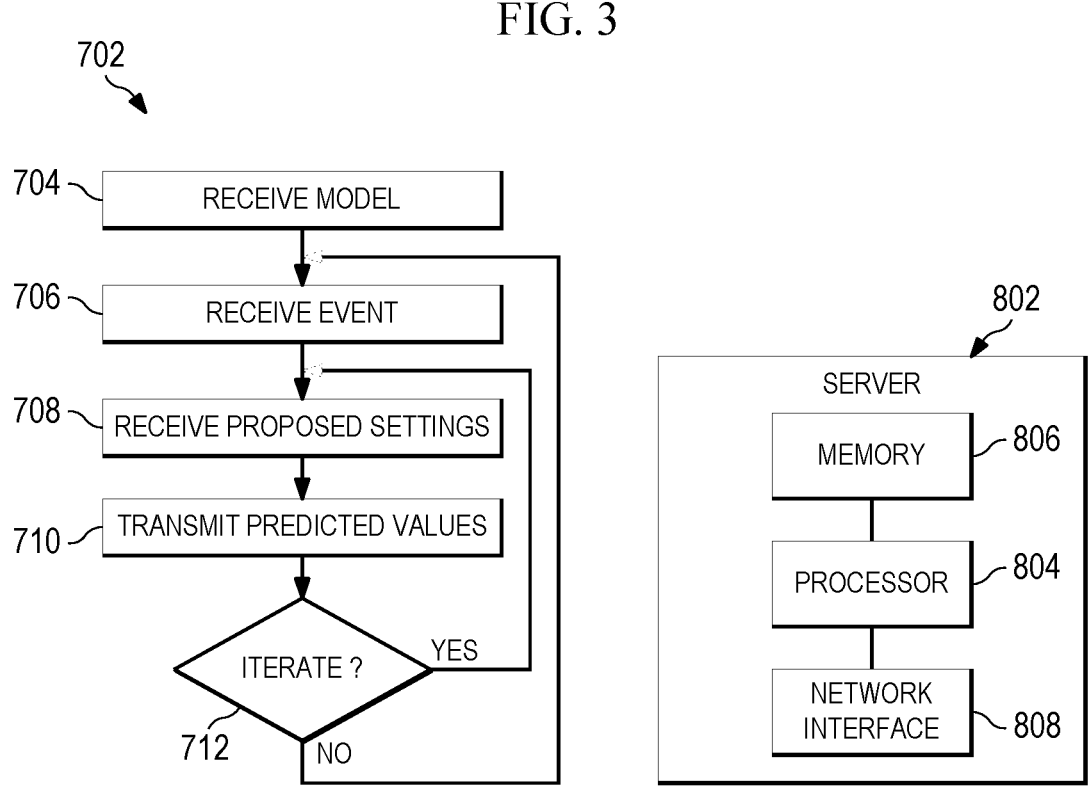
FIG. 7
FIG. 8

NETWORK ABSTRACTOR FOR ADVANCED INTERACTIVE SDN OPTIMIZATION

TECHNICAL FIELD

The present disclosure relates generally to wireless communication networks, and more particularly, to wireless communication networks that have one or more optimizers.

BACKGROUND

Wireless communication networks use multiple optimizers to optimize various settings in a wireless communication network based on events and measured characteristics of the communication network. For example, a traffic engineering optimizer (TE) optimizes the closing rates between nodes of a network and a power control optimizer (PC) optimizes the power levels of the nodes of the network.

The multiple optimizers provide changes to multiple settings at the same time to the communication network. However, the optimizers do not take into account changes to the network caused by the other optimizers.

SUMMARY

According to one embodiment, there is provided a method to optimize settings of a wireless communication network via an abstractor. The method includes receiving, by the abstractor, an event sent by the wireless communication network. The method includes receiving, by the abstractor, one or more proposed settings from one or more optimizers of the wireless communication network. The method includes transmitting, by the abstractor, one or more predicted values to the one or more optimizers. The predicted values predict the effect that the one or more proposed settings will have on the wireless communication network.

In another embodiment, there is provided an apparatus to optimize settings of a wireless communication network. The apparatus comprises a network interface and one or more processors. The network interface is configured to: receive an event sent by the wireless communication network, receive one or more proposed settings from one or more optimizers of the wireless communication network and transmit one or more predicted values to the one or more optimizers. The one or more processors are configured to form the predicted values to predict the effect that the one or more proposed settings will have on the wireless communication network.

In another embodiment, there is provided a computer readable medium comprising one or more instructions that when executed by one or more processors cause the one or more processors to receive an event sent by the wireless communication network, receive one or more proposed settings from one or more optimizers of the wireless communication network, and transmit one or more predicted values to the one or more optimizers. The predicted values predict the effect that the one or more proposed settings will have on the wireless communication network.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 1 illustrates an example communication system that uses signaling to support advanced wireless receivers according to this disclosure;

FIG. 2A illustrates an example user equipment (UE) according to this disclosure;

FIG. 2B illustrates an example base station (BS) according to this disclosure;

FIG. 3 illustrates abstract management of the wireless communication network according to this disclosure;

FIG. 7 illustrates a flowchart of an abstractor according to this disclosure; and FIG. 8 illustrates a server related to an abstractor according to this disclosure.

DETAILED DESCRIPTION

Figure 4:
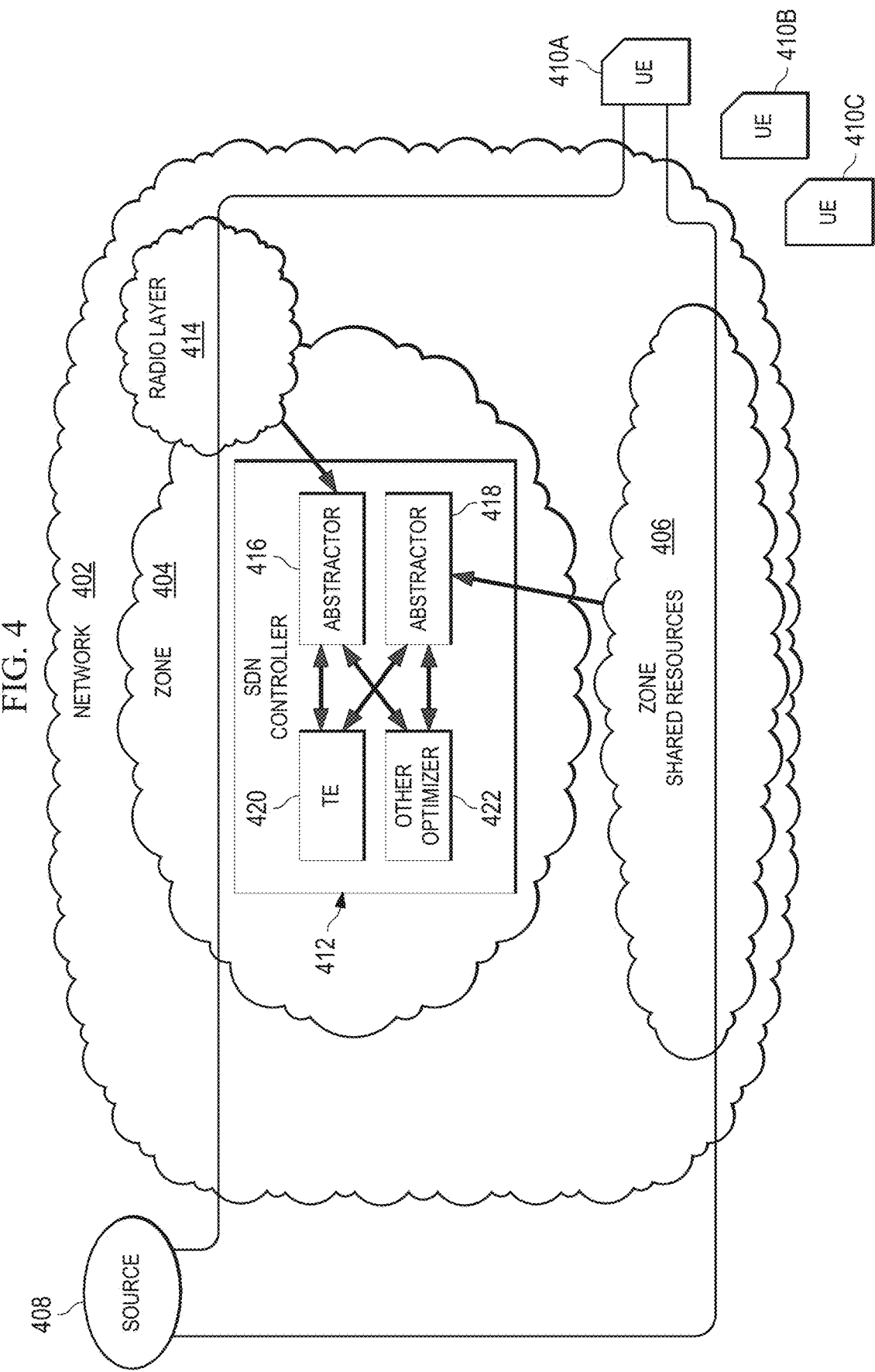
FIG. 4 illustrates a wireless communication network that utilizes abstractors to optimize data flow through the wireless communication network according to this disclosure.

The present disclosure describes a method and apparatus to predict the effect that one or more proposed settings will have on a wireless communication network via an abstractor.

FIG. 1 illustrates an example communication system 100 that uses signaling to support advanced wireless receivers according to this disclosure. In general, the system 100 enables multiple wireless users to transmit and receive data and other content. The system 100 may implement one or more channel access methods, such as code division multiple access (CDMA), time division multiple access (TDMA), frequency division multiple access (FDMA), orthogonal FDMA (OFDMA), single-carrier FDMA (SC-FDMA), spatial division multiple access (SDMA), and so on.

In this example, the communication system 100 includes user equipment (UE) 110*a*-110*c*, radio access networks (RANs) 120*a*-120*b*, a core network 130, a public switched telephone network (PSTN) 140, the Internet 150, and other networks 160. While certain numbers of these components or elements are shown in FIG. 1, any number of these components or elements may be included in the system 100.

The UEs 110*a*-110*c* are configured to operate and/or communicate in the system 100. For example, the UEs 110*a*-110*c* are configured to transmit and/or receive wireless signals, to launch browsers, etc. Each UE 110*a*-110*c* represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

The RANs 120*a*-120*b* include base stations 170*a*-170*b*, respectively. Each base station 170*a*-170*b* is configured to wirelessly interface with one or more of the UEs 110*a*-110*c* to enable access to the core network 130, the PSTN 140, the Internet 150, and/or the other networks 160. For example, the base stations (BSs) 170*a*-170*b* may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the UEs 110a-110c over one or more air interfaces 190 using wireless communication links. The air interfaces 190 may utilize any suitable radio access technology.

It is contemplated that the system 100 may use multiple channel access functionality, including such schemes as described above. In particular embodiments, the base stations and UEs implement LTE, LTE-A, and/or LTE-B. Of course, other multiple access schemes and wireless protocols may be utilized.

The RANs 120a-120b are in communication with the core network 130 to provide the UEs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110a-110c may include functionality for communicating with different wireless networks over different wireless links using different wireless technologies and/or protocols.

Although FIG. 1 illustrates one example of a communication system, various changes may be made to FIG. 1. For example, the communication system 100 could include any number of UEs, base stations, networks, or other components in any suitable configuration, and can further include the abstractor illustrated in any of the figures herein.

FIGS. 2A and 2B illustrate example devices that may implement the methods and teachings according to this disclosure. In particular, FIG. 2A illustrates an example UE 110, and FIG. 2B illustrates an example base station 170. These components could be used in the system 100 or in any other suitable system.

As shown in FIG. 2A, the UE 110 includes at least one processing unit 200. The processing unit 200 implements various processing operations of the UE 110. For example, the processing unit 200 could perform signal coding, data processing, power control, input/output processing, or any other functionality enabling the UE 110 to operate in the system 100. The processing unit 200 also supports the methods and teachings described in more detail below. Each processing unit 200 includes any suitable processing or computing device configured to perform one or more operations. Each processing unit 200 could, for example, include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna 204. The transceiver 202 is also configured to demodulate data or other content received by the at least one antenna 204. Each transceiver 202 includes any suitable structure for generating signals for wireless transmission and/or processing signals received wirelessly. Each antenna 204 includes any suitable structure for transmitting and/or receiving wireless signals. One or multiple transceivers 202 could be used in the UE 110, and one or multiple antennas 204 could be used in the UE 110. Although shown as a single functional unit, a transceiver 202 could also be implemented using at least one transmitter and at least one separate receiver.

The UE 110 further includes one or more input/output devices 206. The input/output devices 206 facilitate interaction with a user. Each input/output device 206 includes any suitable structure for providing information to or receiving information from a user, such as a speaker, microphone, keypad, keyboard, display, or touch screen. In certain embodiments, the UE 110 can connect to the core network 130 or sub-networks via a wired connection.

In addition, the UE 110 includes at least one memory 208. The memory 208 stores instructions and data used, generated, or collected by the UE 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and so on.

As shown in FIG. 2B, the base station 170 includes at least one processing unit 250, at least one transmitter 252, at least one receiver 254, one or more antennas 256, and at least one memory 258. The processing unit 250 implements various processing operations of the base station 170, such as signal coding, data processing, power control, input/output processing, or any other functionality. The processing unit 250 can also support the methods and teachings described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless transmission to one or more UEs or other devices. Each receiver 254 includes any suitable structure for processing signals received wirelessly from one or more UEs or other devices. Although shown as separate components, at least one transmitter 252 and at least one receiver 254 could be combined into a transceiver. Each antenna 256 includes any suitable structure for transmitting and/or receiving wireless signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s).

Additional details regarding UEs 110 and base stations 170 are known to those of skill in the art. As such, these details are omitted here for clarity.

FIG. 3 illustrates abstract management of the wireless communication network according to this disclosure. The embodiments shown in FIG. 3 are for illustration only. Other embodiments could be used without departing from the scope of this disclosure.

The wireless communication network 302 is or includes one or more of core network 130 and RANs 120a and 120b. The wireless communication network 302, as well as any other wireless communication network of this disclosure, can include one or more relays and be a multi-hop network.

The wireless communication network 302 includes one or more portions including wireless connections and one or more portions including wired connections.

The wireless communication network 302 includes one or more zones that group various pieces of equipment within the wireless communication network 302 together. The wireless communication network 302 also includes one or more layers that interoperate to pass data within the wireless communication network 302. Systems of the wireless communication network 302 are managed abstractly by a software defined network (SDN) controller 304. The SDN controller 304 receives various events from the wireless communication network 302, determines any changes to the settings of the wireless communication network 302 based on those events, and sends updated settings to the wireless communication network 302. The wireless communication network 302 receives the updated settings from the SDN controller 304, updates the old settings to the new settings based on the updated settings received from the SDN controller 304, and reports or transmits any new events back to the SDN controller 304 as they happen.

The SDN controller 304 includes one or more optimizers. The optimizers of the SDN controller 304 may include a traffic engineering optimizer (TE) 308 and one or more other optimizers 310, which can be a power control optimizer (PC). The SDN controller 304, including the abstractor 306, the TE optimizer 308, and the other optimizer(s) 310, can each be embodied via one or more servers deployed within the wireless communication network 302. The TE 308 optimizes the flow of data within the wireless communication network 302. The TE 308 receives spectral efficiencies (SEs) and capacities that are related to the flow of data through the wireless communication network 302, determines updated flow and rate settings, and transmits the updated flow and rate settings to the wireless communication network 302. Similarly, the other optimizer 310 receives events and measurements related to one or more zones and layers of the wireless communication network 302, determines updated settings, and transmits the updated settings to the wireless communication network 302. When the other optimizer 310 is embodied as a PC optimizer, the PC optimizer receives event and load measurements related to power usage of the wireless communication network 302, determines new or updated PC levels, and transmits the new or updated power control levels or settings to the wireless communication network 302.

Advantageously, the SDN controller 304 includes one or more abstractors, such as abstractor 306. Each abstractor provides predictive capability for potential changes made to the settings of the wireless communication network 302. Each abstractor provides predictive capability for one or more zones and/or layers of wireless communication network 302. The abstractor 306 provides predictive capability for the wireless communication network 302. The abstractor 306 receives and processes models, settings, abstractions, and measurements from the wireless communication network 302. Based on the processed models, settings, abstractions, and measurements, the abstractor 306 provides predictions of how proposed changes to the settings of the wireless communication network 302 will affect the wireless communication network 302. The abstractor 306 and the optimizers 308-310 are used to optimize one or more of the wireless portions of the wireless communication network 302 and the wired portions of the wireless communication network 302. If the wireless communication network 302 includes one or more relays and/or is a multi-hop network, the abstractor 306 and the optimizers 308-310 can be used to optimize the wireless communication network 302 including the one or more relays and/or the portions that form a multi-hop network.

In certain embodiments, the abstractor 306 takes as inputs one or more measurements and settings related to flows, rates, power masks, intercell interference cancellation (ICIC), successive interference cancellation (SIC), beamforming or precoder combinations, and so on. The abstractor 306 provides as outputs one or more measurements and settings related to spectral efficiencies (SEs) or cumulative distribution functions (CDFs), each of which can be per sub-band, delay profiles, contention factors, rates, resources utilization, feasibility, and so on.

Each optimizer, such as the TE 308 and the other optimizer(s) 310, communicate with one or more abstractors, such as the abstractor 306, and tests possible changes to the settings of the wireless communication network 302 before transmitting the new settings to the wireless communication network 302. The optimizers then receive the predictive outputs from the abstractor and further optimize the updated settings based on the predictive outputs and transmit the further updated settings to the wireless communication network 302. The settings from each optimizer that are transmitted to the network are based on events and measurements received from the network and based on potential changes to the settings from other optimizers. By testing possible changes to the settings of the wireless communication network 302 via the abstractor 306, optimizations that take into account the effects of other optimizers are possible.

The abstractor 306 allows for interactive iterative optimization of the wireless communication network 302 to proactively update the settings of the wireless communication network 302. The abstractor 306 allows for the SDN controller 304 to anticipate the reaction of multiple layers or zones and improve the optimization of the settings before being transmitted to the wireless communication network 302.

In certain embodiments, the abstractor 306 allows for interlayer optimization, such as between the radio layer, wireless backhaul layer, and wired backhaul layers of the wireless communication network 302. In certain embodiments, the abstractor 306 allows for inter-zone optimization, such as between multiple subdivisions of one operator's wireless communication network and/or between shared resources of multiple operators' wireless communication networks.

The abstractor 306 acts as an emulator that captures essential dynamics of the one or more zones or layers of the wireless communication network 302 defined and controlled by the SDN controller 304. The abstractor 306 can be embodied as a separate apparatus within the wireless communication network 302, or as a software driver within a controller of the SDN controller 304.

The abstractor 306 can be accessed by an application programming interface API. The abstractor 306 is configured by the one or more zones or layers and its purpose is to anticipate the effects of changes to the settings of the wireless communication network 302 in order to provide optimal settings to the wireless communication network 302 that are based on potential changes to settings provided by multiple optimizers and the effects those changes would have on the multiple layers and zones that interact within the wireless communication network 302.

The services of the wireless communication network 302 are managed through abstraction of the lower level functionality of the wireless communication network. The system making decisions about where data traffic sent is decoupled from the underlying systems that forward data traffic to select destinations or nodes. The systems and components of the SDN controller 304 make decisions about where data traffic is sent in the underlying wireless communication network 302 and these decisions can be based on predicted values provided by one or more abstractors within an SDN controlled by an SDN controller.

FIG. 4 illustrates a wireless communication network that utilizes abstractors to optimize data flow through the wireless communication network according to this disclosure. The embodiments shown in FIG. 4 are for illustration only. Other embodiments could be used without departing from the scope of this disclosure.

The wireless communication network 402 is or includes one or more of core network 130 and RANs 120a and 120b and is a further embodiment of the wireless communication network 302. The wireless communication network 402 is subdivided into a first zone 404 owned by a first operator and a second zone 406 owned by a second operator that are utilized in concert to transfer data between the source 408 and the UE 410a with data flowing through both operators' zones of the wireless communication network 402.

The source 408 is a source of data or content, such as a server or another UE in another wireless communication network. The source 408 sends the data to the UE 410a with some of the data passing through the zone 404 and some of the data passing through the zone 406 of the wireless communication network 402.

The zone 404 is a first zone of the wireless communication network 402 and is owned by the first operator. The zone 404 includes the SDN controller 412 and the radio layer 414. The zone 404 includes one or more radio access networks, such as RANs 120a or 120b, and core networks, such as core network 130 that provides for the transport and flow of data through the zone 404 of the wireless communication network 402.

The zone 406 is a second zone of the wireless communication network 402 and is owned by the second operator. The zone 406 provides the second abstractor 418 of the SDN controller 412, which is used by the TE 420 and the other optimizer 422 to optimize the settings for the zone 404, the zone 406, and the wireless communication network 402.

The operator of the zone 406 shares resources of the 406 zone with the zone 404 of the first operator but does not share the specific details of the zone 406. By providing the second abstractor 418 of the SDN controller 412 of the zone 404, the SDN controller 412, via the TE 420 and the other optimizer 422, optimizes settings of the radio layer 414 and the zone 404 as a whole based upon predicted or anticipated behavior of the zone 406, which is provided by the abstractor 418.

The SDN controller 412 includes the first abstractor 416 and the second abstractor 418. The first abstractor 416 is associated with the radio layer 414 of the zone 404 of the wireless communication network 402. The second abstractor 418 is associated with the second zone 406 of the wireless communication network 402. The SDN controller 412 also includes the TE 420 and the other optimizer 422. The SDN controller 412 monitors events and controls the settings of the zone 404 of the wireless communication network 402, and can be a further embodiment of the SDN controller 304 of FIG. 3.

The first abstractor 416 and the second abstractor 418 interact with the optimizers 420 and 422 of the SDN controller 412. The first abstractor 416 and the second abstractor 418 provide predictions as to how the wireless communication network 402, the zone 404, the radio layer 414, and the zone 406 will be affected by changes to the settings of the wireless communication network 402 that are proposed by the optimizers 420 and 422. Based on these predictions, the optimizers 420 and 422 further refine and optimize the proposed changes to form new settings that are provided to the zone 404 and the radio layer 414 of the wireless communication network 402 via the SDN controller 412. The abstractors 416 and 418 can be embodied the as software resident on one or more servers within the zone 404 owned by the first operator.

One or more APIs are used by the SDN controller 412 and the optimizers 420 and 422 to access the abstractors 416 and 418 either individually or as a whole. For the embodiment illustrated in FIG. 4, the first abstractor 416 relates to and provides predictions for the radio layer 414 and the second abstractor 418 relates to an provides predictions for the zone 406.

Intra-zone and inter-zone interactions are possible with the abstractors 416 and 418. For example, the second operator shares resources of the second zone 406 with the first operator. The second operator provides the first operator access to the abstractor 418 to allow the first operator to optimize usage of the second operators' shared resources from the second zone 406 of the wireless communication network 402. While sharing the second abstractor 418, the second operator can still hide the topology of the second zone 406 and enable advanced optimization.

The optimizers 420 and 422 receive events and measurements related to the zone 404 and the radio layer 414 of the wireless communication network 402 via the SDN controller 412. Based on the events and measurements received, the optimizers 420 and 422 determine new settings to be provided to the zone 404, the zone 406, and the radio layer 414 of the wireless communication network 402. Advantageously, before sending the new settings to the wireless communication network 402, the new settings are tested via the abstractors 416 and 418. Feedback from the abstractors 416 and 418 provide predictions as to how the wireless communication network 402 will be affected by the new settings proposed by the optimizers 420 and 422. The optimizers 420 and 422 then provide another new set of optimizations and settings based on the predictions provided by the abstractors 416 and 418 to further optimize the settings to be provided to the zone 404, the zone 406, and the radio layer 414 of the wireless communication network 402.

The number of rounds of using the abstractors to predict effects of new settings on the wireless communication network 402 can be fixed or variable. When variable, a prior round of settings and predictions are compared with a subsequent round of settings and predictions and until differences between the two reach an acceptable predetermined limit.

The optimizers utilized via the SDN controller 412 of the zone 404 of the wireless communication network 402 can include anything that adjusts parameters of the nodes of the wireless communication network 402. For radio nodes, such as BS 170a and BS 170b, the optimizers include: power control (PC); pre-coders, beam forming, and spatial division multiple access (SDMA); weights for weighted schedulers; on/off states for power savings; and so on. Traffic engineering optimizers, such as the TE 420, address and optimize: routes for flows of data within the wireless communication network 402; multipath routes and rates or ratios of traffic; rates for traffic shapers; coding ratios for multicast network-coding encoders; other policies for packets, such as dropping policies, default routing behaviors, etc.; and so on.

The radio layer 414 encompasses the radio communication within the wireless communication network 402, including the radio communication between one or more BSs, such as BS 170a and BS 170b, and one or more UEs, such as UEs 110a-110c, and includes the settings, parameters, and measurements related to the radio communication. The abstractor 416 is provided to the SDN controller 412 to model and provide accurate predictions for changes to the radio layer 414.

Figure 5:
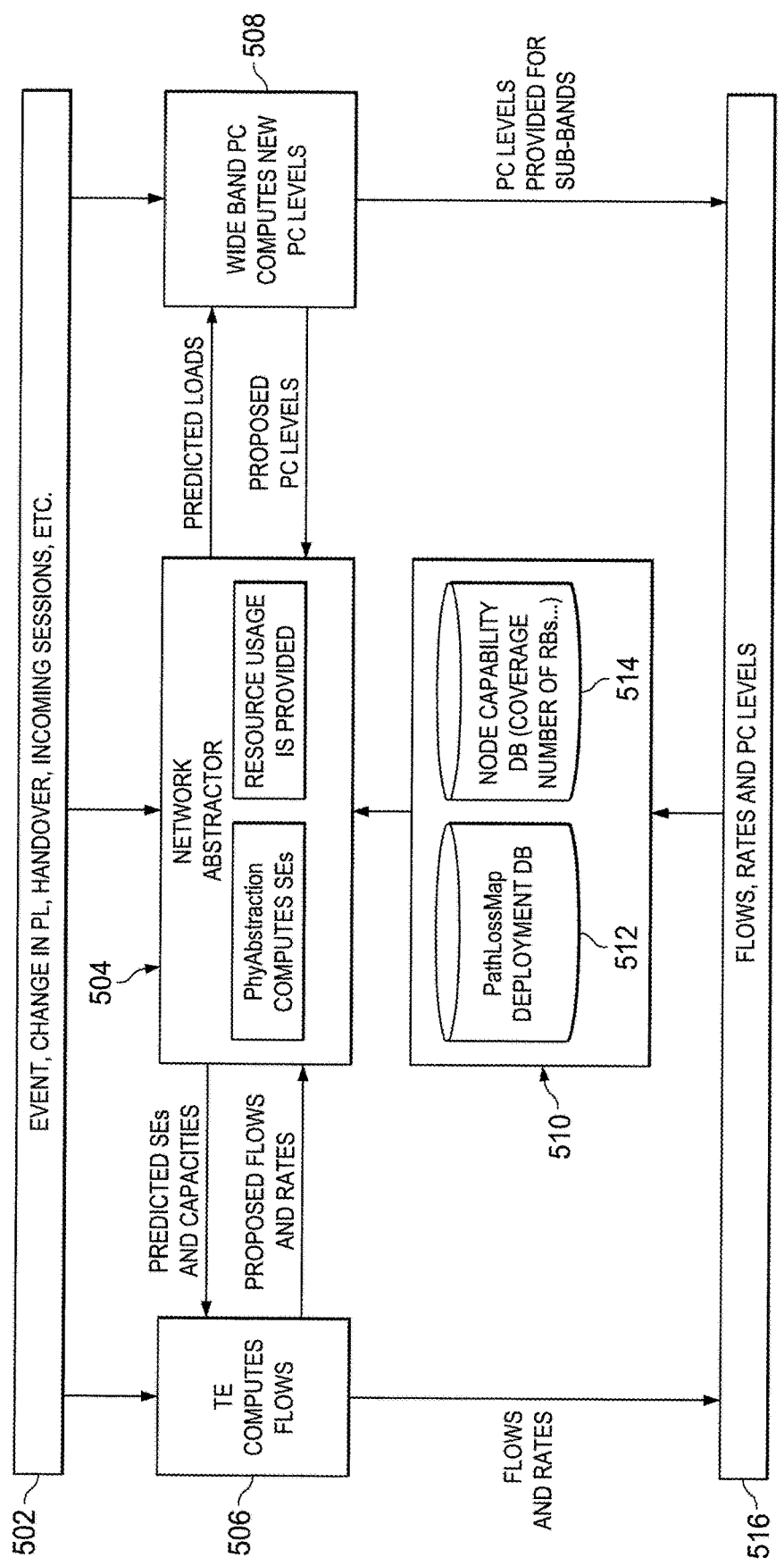
FIG. 5 illustrates a flow of data related to the abstractor of a wireless communication network according to this disclosure.

FIG. 5 illustrates a flow of data related to the abstractor of a wireless communication network. The embodiments shown in FIG. 5 are for illustration only. Other embodiments could be used without departing from the scope of this disclosure.

Wireless communication network data 502, which includes one or more of events, changes in path loss, handovers, incoming sessions, spectral efficiencies (SEs), capacities, loads, and so one, are transmitted by the wireless communication network and received by the network abstractor 504 and one or more optimizers, such as the TE 506 and the wide band PC 508.

Based on the wireless communication network data 502, the TE 506 computes updated flows and rates. The updated flows and rates are sent to the network abstractor 504. Based on the wireless communication network data 502, the wide band PC 508 computes updated power control levels for sub-bands. The updated power control levels for sub-bands are sent to the network abstractor 504.

The network abstractor 504 is an embodiment of the abstractor 306, the abstractor 416 and the abstractor 418. The network abstractor 504 has access to one or more databases (DBs) 510 that each include one or more databases. The DB 512 includes the path loss map and the deployment DB. The DB 514 includes the node capability DB, which maintains data related to coverage, the number of resource blocks, and so on, of the nodes of the wireless communication network. The deployment DB stores data related to wired or wireless link capabilities and node capabilities. The node capability DB can be included as a part of the deployment DB. Based on the data from the one or more databases 510, the wireless network communication data 502, the proposed flows and rates computed by the TE 506, and the proposed PC levels computed by the wideband PC 508, the network abstractor 504 computes and provides predicted data, including predicted SEs and capacities and predicted loads, to the TE 506 and the wide band PC 508.

The network abstractor 504 is used as an emulator or predictor for advanced optimization. The network abstractor 504 provides a simplified model of how the wireless communication network behaves and can be used by one or more layers and/or one or more zones of the wireless communication network. The network abstractor 504 provides predictions of values that are not otherwise available, such as varying data flow rates given traffic and routes, contention probabilities, delay probabilities, identifications of bottleneck links, and so on. Outputs of the network abstractor 504 are used by optimizers within the SDN, such as the TE 506 and the wide band PC 508, to improve the outputs of the optimizers jointly and proactively.

In certain embodiments, off-the-shelf optimizers can be used with the network abstractor 504 to intuitively adjust inputs given to the optimizers based on outputs from the network abstractor 504. The network abstractor 504 can be used in parallel to test multiple sets of proposed settings from one or more optimizers and improving the settings in parallel before a final selection of settings that will be sent to the wireless communication network.

The network abstractor 504 sends the predicted SEs and capacities to the TE 506 and the TE 506 receives the predicted SEs and capacities. The TE 506 recomputes flows and rates to form updated flows and rates based on the predicted SEs and capacities that were provided by the network abstractor 504 and were based on data from the one or more databases 510, the proposed PC levels from the wide band PC 508, and the wireless network communication data 502. The TE 506 provides the updated flows and rates to the wireless communication network. The updated flows and rates are based on the wireless communication network data 502, data from the one or more databases 510, and the proposed PC levels from the wide band PC 508. The updated flows and rates are pushed down to the wireless communication network to form a portion of the new wireless communication network data 516.

The network abstractor 504 sends the predicted loads to the wide band PC 508 and the wide band PC 508 receives the predicted loads. The wide band PC 508 recomputes the PC levels to form updated PC levels based on the predicted loads that were provided by the network abstractor 504 and were based on data from the one or more databases 510, the proposed flows and rates from the TE 506, and the wireless network communication data 502. The wide band PC 508 provides the updated PC levels to the wireless communication network. The updated PC levels are based on the wireless communication network data 502, data from the one or more databases 510, and the proposed PC levels from the wide band PC 508. The updated PC levels are pushed down to the wireless communication network to form a portion of the new wireless communication network data 516. In certain embodiments, the wide band PC optimizer 508 is iteratively used to generate multiple bands of power levels while using an abstraction that supports multiband power levels via the network abstractor 504.

The one or more databases 510 maintain data related to the wireless communication network. As updated settings are pushed down to the wireless communication network, the one or more databases 510 are updated to accurately reflect the current state of the wireless communication network.

Figure 6:
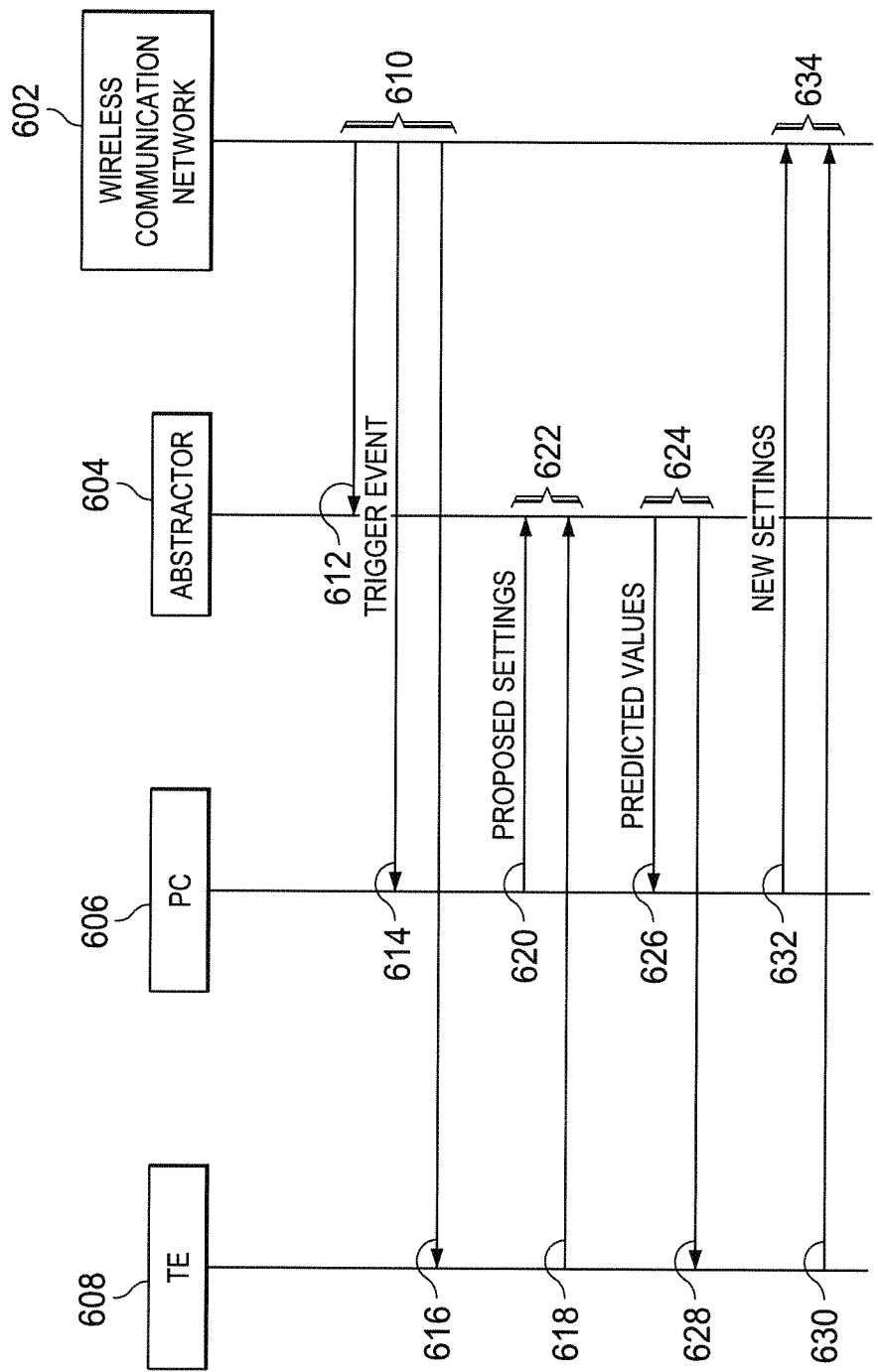
FIG. 6 illustrates a data flow diagram of a wireless communication network according to this disclosure.

FIG. 6 illustrates a data flow diagram of a wireless communication network, according to this disclosure. The embodiments shown in FIG. 6 are for illustration only. Other embodiments could be used without departing from the scope of this disclosure.

The wireless communication network 602 is an embodiment of one or more of the core network 130, the RAN 120a, the RAN 120b, the wireless communication network 302, the wireless communication network 402, and so on. The wireless communication network 602 includes the abstractor 604, the PC 606, and the TE 608. The wireless communication network 602 incorporates several settings that are optimized by one or more optimizers, such as the PC 606 and the TE 608, and through the use of one or more abstractors, including the abstractor 604.

The wireless communication network 602 sends a trigger event at 610. The abstractor 604, the PC 606, and the TE 608 receive the trigger event respectively at 612, 614, and 616. The trigger event may be sent directly from the wireless communication network 602 to the abstractor 604, the PC 606, and the TE 608, or alternatively, the trigger event may be sent to the abstractor 604 and then passed along to the PC 606 and the TE 608. Based on the trigger event, the TE 608 and the PC 606 determine proposed settings.

At 618, the TE 608 sends its proposed settings to the abstractor 604. At 620, the PC 606 sends its proposed settings to the abstractor 604. At 622, the abstractor 604 receives the proposed settings from the TE 608 and the PC 606. The abstractor 604 processes the proposed settings from the TE 608 and the PC 606 and determines predicted values related to the effect that the proposed settings will have on the wireless communication network 602.

At 624, the abstractor 604 sends one or more predicted values to the PC 606 and the TE 608. At 626, the PC 606 receives one or more predicted values from the abstractor 604. At 628, the TE 608 receives one or more predicted values from the abstractor 604. The TE 608 and the PC 606 determine new settings that will be sent to the wireless communication network 602, which new settings are based on the predicted values determined by the abstractor 604.

In certain embodiments, another set of proposed settings from the TE 608 and PC 606 are sent to the abstractor 604. The abstractor 604 then calculates new predicted values based on the additional set of proposed settings and sends the new predicted values to the TE 608 and the PC 606. The number of rounds or iterations of generating proposed settings and predicted values is a fixed or variable number. The new settings sent by the TE 608 and the PC 606 are based on one or more iterations of predicted values and one or more iterations of proposed settings.

At 630, the TE 608 sends the new settings to the wireless communication network 602. At 632, the PC 606 sends the new settings to the wireless communication network 602. At 634, the wireless communication network 602 receives the new settings from the TE 608 and the PC 606. The new settings received by the wireless communication network 602 are based on one or more of trigger events from the wireless communication network 602, one or more rounds of proposed settings from the TE 608 and the PC 606, and one or more rounds of predicted values determined by the abstractor 604

FIG. 7 illustrates a flowchart of an abstractor according to this disclosure. While the flowchart depicts a series of sequential steps, the scope of the present disclosure is not limited to the sequence depicted and described. The steps can be performed in a different order, with additional, intervening, or intermediate steps, and without steps that have been depicted. The process depicted in the example is implemented by any suitably configured electronic device.

The method 702 is embodied and/or deployed via an abstractor, such as the abstractor 306, the abstractor 416, abstractor 418, network abstractor 504, and the abstractor 604. At 704, the abstractor receives a model of the one or more zones and layers that the abstractor will emulate. The model is provided by the operator of the particular zone of the wireless communication network comprising the zone to be emulated.

At 706, the abstractor receives an event from the wireless communication network. Types of events include a change in path loss, a handover, a new incoming session, the addition or removal of a BS from the wireless communication network, the addition or removal of a UE from the wireless communication network, a change of capabilities of wired or wireless backhaul, the addition or removal of a failed link, the addition or removal of a router and so on.

At 708, the abstractor receives proposed settings from one or more optimizers. The proposed settings are based on the event and include settings for one or more of power control (PC); pre-coders for beam forming or spatial division multiple access (SDMA); weights for weighted schedulers; on/off states for power savings; and so on. The proposed settings are calculated by the one or more optimizers to handle the event that was received by the abstractor at 706.

At 708, the abstractor transmits predicted values back to the one or more optimizers. The predicted values are based on the event received from the wireless communication network at 706 and the proposed settings received from the optimizers at 708. The predicted values include predictions of values that are not otherwise available, such as varying data flow rates given traffic and routes, contention probabilities, delay probabilities, identifications of bottleneck links, and so on. Based on the predicted values, the one or more optimizers can further refine and optimize the new settings that are to be pushed out to the wireless communication network.

At 712, the abstractor decides whether to iterate through another round of receiving proposed settings and transmitting predicted values or not. The abstractor or the SDN controller controlling the abstractor can set a threshold number of iterations. If the current number of iterations does not yet meet the threshold, then the abstractor will do another iteration to receive another round of proposed settings at 708 and send another round of predicted values at 710.

In certain embodiments, a variable number of iterations may be set so that the abstractor continues to iterate until a subsequent set of proposed settings differs by less than a threshold amount from a prior set of proposed settings. Additionally, the SDN controller controlling the abstractor can control the iteration process to set thresholds and/or switch back and forth between fixed or variable numbers of iterations.

FIG. 8 illustrates a server related to an abstractor, according to this disclosure. The embodiments shown in FIG. 8 are for illustration only. Other embodiments could be used without departing from the scope of this disclosure.

The server 802 hosts or is deployed as an abstractor, such as the abstractor 306, the abstractor 416, the abstractor 418, the network abstractor 504, the abstractor 604, and so on. The server 802 includes the processor 804, the memory 806, and the network interface 808.

The server 802 may include an operating system that provides executable program instructions for the general administration and operation of that server, and typically will include a computer-readable medium storing instructions that, when executed by the processor 804 of the server 802, allow the server 802 to perform its intended functions. Suitable implementations for the operating system and general functionality of the servers are known or commercially available, and are readily implemented by persons having ordinary skill in the art.

The processor 804 includes one or more processors that are connected to the memory 806 and the network interface 808. The network interface 808 allows the server 802 to send and receive data to the nodes and other devices of the wireless communication network within which server 802 is deployed.

The memory 806 comprises one or more memories and includes data and instructions that when executed by the processor 804 operate as an abstractor to provide predicted values to one or more optimizers of the wireless communication network within which the server 802 is deployed. When executed, the instructions within the memory 806 cause the one or more processors to perform the steps of a method of an abstractor, including the method 702 described in FIG. 7. The memory 806 can be embodied as a computer readable medium, such as a hard disk drive, a flash drive, random access memory, read only memory, and so on.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method to optimize settings of a wireless communication network via an abstractor, the method comprising:
   receiving, by the abstractor, an event of a change in the wireless communication network sent by the wireless communication network;
   receiving, by the abstractor, two or more proposed settings of the wireless communication network from two or more different optimizers of the wireless communication network, wherein the two or more proposed settings include a first proposed setting of the wireless communication network and a second proposed setting of the wireless communication network, the receiving the two or more proposed settings comprising:
      receiving, by the abstractor from a first optimizer of the two or more different optimizers, the first proposed setting of the wireless communication network, the first proposed setting generated based on the event of the change in the wireless communication network, and
      receiving, by the abstractor from a second optimizer of the two or more different optimizers, the second proposed setting of the wireless communication network generated based on the event of the change in the wireless communication network;
   after the receiving the two or more proposed settings from the two or more different optimizers;
      determining, by the abstractor, one or more predicted values using a model of the wireless communication network as an emulator based on the first proposed setting and the second proposed setting; and
      transmitting, by the abstractor, the one or more predicted values based on the two or more proposed settings to the two or more different optimizers in advance of implementation of the two or more proposed settings in the wireless communication network, wherein the one or more predicted values predict a joint effect that the two or more proposed settings from the two or more different optimizers will have on the wireless communication network, the transmitting comprising:
         transmitting, by the abstractor, the one or more predicted values to the first optimizer for the first optimizer to update the first proposed setting, and
         transmitting, by the abstractor, the one or more predicted values to the second optimizer for the second optimizer to update the second proposed setting.

2. The method of claim 1, wherein the abstractor and the two or more different optimizers are included as part of a software defined network (SDN) controller within the wireless communication network.

3. The method of claim 2, wherein the SDN controller makes decisions about where data traffic is sent in the wireless communication network based on the one or more predicted values provided by the abstractor.

4. The method of claim 1, wherein the two or more different optimizers provide new settings to the wireless communication network that are based on the predicted values.

5. The method of claim 4, wherein the new settings provided by the first optimizer of the two or more different optimizers are further based on proposed settings of the second optimizer of the two or more different optimizers.

6. The method of claim 1, further comprising:
   receiving database data from one or more databases maintained within the wireless communication network,
   wherein the database data is used to determine the one or more predicted values and the one or more databases comprise one or more of a path loss map, a deployment database, and a node capability database.

7. The method of claim 6, wherein the one or more predicted values are based on the event and the database data, and wherein the event comprises one of a change in path loss, a handover, an incoming session, an addition of a base station (BS) to the wireless communication network, a removal of a BS from the wireless communication network, an addition of a user equipment (UE) to the wireless communication network, a removal of a UE from the wireless communication network, a change of capabilities of wired or wireless backhaul, an addition of a failed link, a removal of a failed link, an addition of a router, or a removal of a router.

8. The method of claim 1, wherein the event comprises one of a change in path loss, a handover, an incoming session, an addition of a base station (BS) to the wireless communication network, a removal of a BS from the wireless communication network, an addition of a user equipment (UE) to the wireless communication network, a removal of a UE from the wireless communication network, a change of capabilities of wired or wireless backhaul, an addition of a failed link, a removal of a failed link, an addition of a router, or a removal of a router.

9. The method of claim 1, wherein the two or more proposed settings relate to the wireless communication network and include one or more of flows, rates, power control (PC) levels, pre-coders, weights, states, coding ratios, and policies.

10. The method of claim 1, further comprising:
    after the transmitting the one or more predicted values to the two or more different optimizers, receiving, by the abstractor from the two or more different optimizers, two or more updated settings based on the one or more predicted values from the abstractor to the two or more different optimizers.

11. The method of claim 1, wherein the first proposed setting is a first acceptable setting to optimize the wireless communication network and is generated further based on measurements from the wireless communication network, and wherein the second proposed setting is a second acceptable setting to optimize the wireless communication network and is generated further based on measurements from the wireless communication network.

12. An apparatus to optimize settings of a wireless communication network, the apparatus comprising:
    a network interface configured to:
       receive an event of a change in the wireless communication network sent by the wireless communication network,
       receive two or more proposed settings of the wireless communication network from two or more different optimizers of the wireless communication network, wherein the two or more proposed settings include a first proposed setting of the wireless communication network and a second proposed setting of the wireless communication network, receiving of the two or more proposed settings comprising:

receiving, from a first optimizer of the two or more different optimizers, the first proposed setting of the wireless communication network, the first proposed setting generated based on the event of the change in the wireless communication network, and receiving, from a second optimizer of the two or more different optimizers, the second proposed setting of the wireless communication network generated based on the event of the change in the wireless communication network, determine one or more predicted values using a model of the wireless communication network as an emulator based on the first proposed setting and the second proposed setting, and transmit the one or more predicted values to the two or more different optimizers after receiving the two or more proposed settings from the two or more different optimizers and prior to implementation of the two or more proposed settings in the wireless communication network, transmitting of the one or more predicted values comprising:

transmit the one or more predicted values to the first optimizer for the first optimizer to update the first proposed setting, and transmit the one or more predicted values to the second optimizer for the second optimizer to update the second proposed setting; and one or more processors configured to:
form the one or more predicted values based on the two or more proposed settings, wherein the one or more predicted values predict a joint effect that the two or more proposed settings from the two or more different optimizers will have on the wireless communication network.

13. The apparatus of claim 12, wherein the apparatus and the two or more different optimizers are included as part of a software defined network (SDN) controller within the wireless communication network.

14. The apparatus of claim 13, wherein the SDN controller makes decisions about where data traffic is sent in the wireless communication network based on the one or more predicted values provided by the apparatus.

15. The apparatus of claim 12, wherein the two or more different optimizers provide new settings to the wireless communication network that are based on the predicted values.

16. The apparatus of claim 15, wherein the new settings provided by the first optimizer of the two or more different optimizers are further based on proposed settings of the second optimizer of the two or more different optimizers.

17. The apparatus of claim 12, further comprising:
the network interface further configured to receive database data from one or more databases maintained within the wireless communication network; and
the one or more processors further configured to determine, using the database data, the predicted values,
wherein the one or more databases comprise one or more of a path loss map, a deployment database, and a node capability database.

18. The apparatus of claim 12, wherein the event comprises one of a change in path loss, a handover, an incoming session, an addition of a base station (BS) to the wireless communication network, a removal of a BS from the wireless communication network, an addition of a user equipment (UE) to the wireless communication network, a removal of a UE from the wireless communication network, a change of capabilities of wired or wireless backhaul, an addition of a failed link, a removal of a failed link, an addition of a router, or a removal of a router.

19. The apparatus of claim 12, wherein the two or more proposed settings relate to the wireless communication network and include one or more of flows, rates, power control (PC) levels, pre-coders, weights, states, coding ratios, and policies.

20. A non-transitory computer readable medium comprising one or more instructions that when executed by one or more processors cause the one or more processors to:
receive an event of a change in a wireless communication network sent by the wireless communication network;
receive two or more proposed settings of the wireless communication network from two or more different optimizers of the wireless communication network, wherein the two or more proposed settings include a first proposed setting of the wireless communication network and a second proposed setting of the wireless communication network, receiving of the two or more proposed settings comprising:
receiving, from a first optimizer of the two or more different optimizers, the first proposed setting of the wireless communication network, the first proposed setting generated based on the event of the change in the wireless communication network, and
receiving, from a second optimizer of the two or more different optimizers, the second proposed setting of the wireless communication network generated based on the event of the change in the wireless communication network; and
after receiving the two or more proposed settings from the two or more different optimizers:
determine one or more predicted values using a model of the wireless communication network as an emulator based on the first proposed setting and the second proposed setting
transmit the one or more predicted values based on the two or more proposed settings to the two or more different optimizers prior to implementation of the one or more proposed settings in the wireless communication network, wherein the one or more predicted values predict a joint effect that the two or more proposed settings from the two or more different optimizers will have on the wireless communication network, transmitting of the one or more predicted values comprising:
transmit the one or more predicted values to the first optimizer for the first optimizer to update the first proposed setting, and
transmit the one or more predicted values to the second optimizer for the second optimizer to update the second proposed setting.

21. The non-transitory computer readable medium of claim 20, wherein the two or more different optimizers are included as part of a software defined network (SDN) controller within the wireless communication network.

22. The non-transitory computer readable medium of claim 21, wherein the SDN controller makes decisions about where data traffic is sent in the wireless communication network based on the one or more predicted values provided by the one or more processors.

23. The non-transitory computer readable medium of claim 20, wherein the two or more different optimizers provide new settings to the wireless communication network that are based on the predicted values.

24. The non-transitory computer readable medium of claim 23, wherein the new settings provided by the first optimizer of the two or more different optimizers are further based on the proposed settings of the second optimizer of the two or more different optimizers.

25. The non-transitory computer readable medium of claim 20, wherein the one or more instructions further cause the one or more processors to:
receive database data from one or more databases maintained within the wireless communication network; and
determine, using the database data, the predicted values, wherein the one or more databases comprise one or more of a path loss map, a deployment database, and a node capability database.

26. The non-transitory computer readable medium of claim 20, wherein the event comprises one of a change in path loss, a handover, an incoming session, an addition of a base station (BS) to the wireless communication network, a removal of a BS from the wireless communication network, an addition of a user equipment (UE) to the wireless communication network, a removal of a UE from the wireless communication network, a change of capabilities of wired or wireless backhaul, an addition of a failed link, a removal of a failed link, an addition of a router, or a removal of a router.

27. The non-transitory computer readable medium of claim 20, wherein the two or more proposed settings relate to the wireless communication network and include one or more of flows, rates, power control (PC) levels, pre-coders, weights, states, coding ratios, and policies.

* * * * *

UNITED STATES PATENT AND TRADEMARK OFFICE
CERTIFICATE OF CORRECTION

PATENT NO. : 10,757,630 B2
APPLICATION NO. : 14/555018
DATED : August 25, 2020
INVENTOR(S) : Philippe Leroux It is certified that error appears in the above-identified patent and that said Letters Patent is hereby corrected as shown below:

In the Claims

In Column 13, Line 32, Claim 1, delete "different optimizers;" and insert --different optimizers:--.

Signed and Sealed this
Third Day of November, 2020

Andrei Iancu
*Director of the United States Patent and Trademark Office*